United States Patent [19]
Sami

[11] 4,018,404
[45] Apr. 19, 1977

[54] AUTOMATIC TAPE STOPPING DETECTIVE DEVICE IN A MAGNETIC RECORDING AND REPRODUCING APPARATUS

[75] Inventor: Yasuo Sami, Yamatotakada, Japan

[73] Assignee: Sanyo Electric Co., Ltd., Osaka, Japan

[22] Filed: June 4, 1975

[21] Appl. No.: 583,695

[30] Foreign Application Priority Data
June 11, 1974 Japan .................... 49-66718

[52] U.S. Cl. .............................. 242/200; 360/74
[51] Int. Cl.[2] ................. G03B 1/04; G11B 15/32; G11B 23/04
[58] Field of Search .................... 242/186–191, 242/200; 360/73, 74, 96

[56] References Cited
UNITED STATES PATENTS

| | | | |
|---|---|---|---|
| 3,608,845 | 9/1971 | Kozu et al. | 242/186 |
| 3,677,493 | 7/1972 | Staar | 242/191 |
| 3,887,943 | 6/1975 | Katsurayama | 360/96 |

Primary Examiner—Leonard D. Christian
Attorney, Agent, or Firm—Birch, Stewart, Kolasch and Birch

[57] ABSTRACT

This invention provides for an automatic tape stopping detective device in a magnetic recording and reproducing apparatus which detects the stopping of the run of the tape, having a take-up reel disk which rotates with the run of the tape, a crank pulley which always rotates whether the tape is running or not, a main lever which, being driven by the crank pulley, moves leftwards and rightwards by a definite stroke, a sub-lever which, having a sliding mechanism with the main lever, moves leftwards and rightwards with the main lever while the take-up reel disk is rotating and stops regardless of the movement of the main lever while the take-up reel disk is not rotating, and a control lever which, pivotally mounted on the main lever, moves with the movement of the main lever when the sub-lever stops.

8 Claims, 7 Drawing Figures

FIG—1
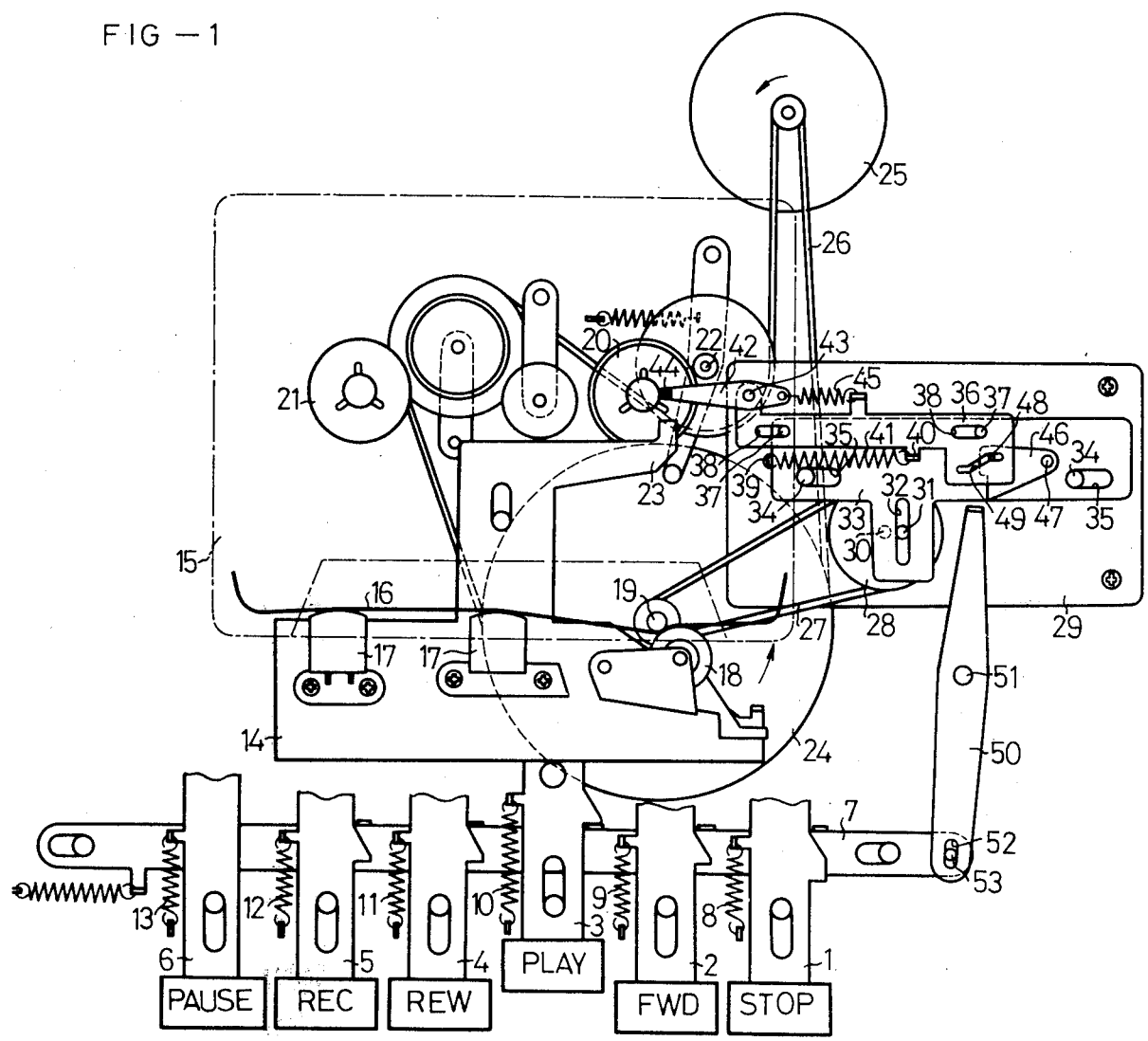

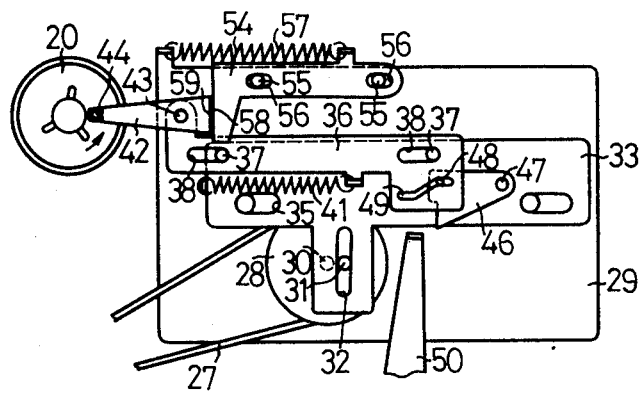
FIG—3A
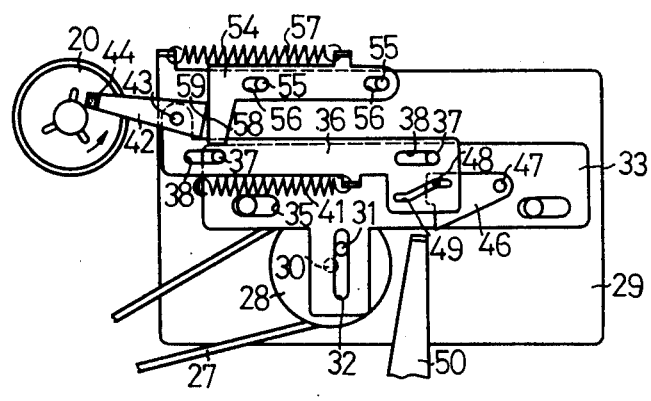
FIG—3B
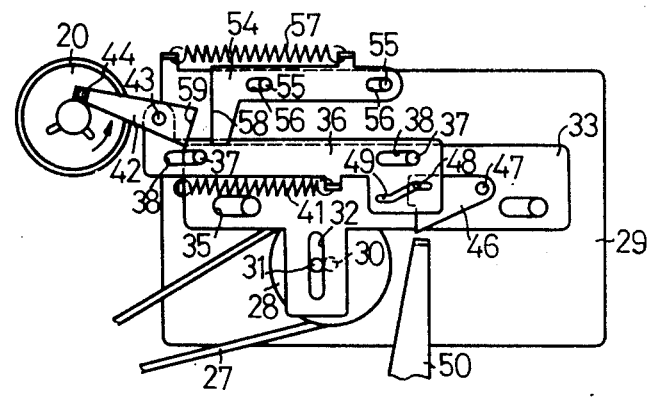
FIG—3C

AUTOMATIC TAPE STOPPING DETECTIVE DEVICE IN A MAGNETIC RECORDING AND REPRODUCING APPARATUS

BACKGROUND OF THE INVENTION

This invention relates to a magnetic recording and reproducing apparatus, especially that of cassette-type which uses a cassette tape. This invention provides for an automatic tape stopping detective device which detects the stopping of the tape when the tape is fully wound in any mode of operation, fast forward winding, rewinding, etc. So, it is possible to make the apparatus in a mode of suspension automatically or to switch the running direction of the tape in reverse automatically by the automatic detection of the stopping of the tape.

In a magnetic recording and reproducing apparatus, it is generally desirable to halt the driving mechanism of the tape when the tape is fully wound in a direction. And, conventionally, there are a lot of proposals to do so. However, conventional electrical or mechanical automatic stopping mechanisms are all complex and expensive, and they are also inconvenient because it takes a long time to detect the stopping of the tape.

PURPOSE OF THE INVENTION

The object of this invention is to provide a device which detects the stopping of the tape rapidly by a simple mechanism in a magnetic recording and reproducing apparatus.

BRIEF DESCRIPTION OF THE DRAWINGS

FIG. 1 is a top view of an example of automatic tape stopping detective device of this invention.

FIG. 2A is that in the mode of reproducing recording and fast forward winding operation, FIG. 2B is that in the mode of rewinding operation, and FIG. 2C is that in the mode of suspension.

FIGS. 3A, 3B and 3C are top views of essential parts of another example of this invention in different states. FIG. 3A is that in the state where the detective lever is positioned rightwards; FIG. 3B is that in the state where the detective lever is positioned a little leftwards; and FIG. 3C is that in the state where the detective lever is positioned fully leftwards.

DETAILED DESCRIPTION OF THE INVENTION

Figure 2A:
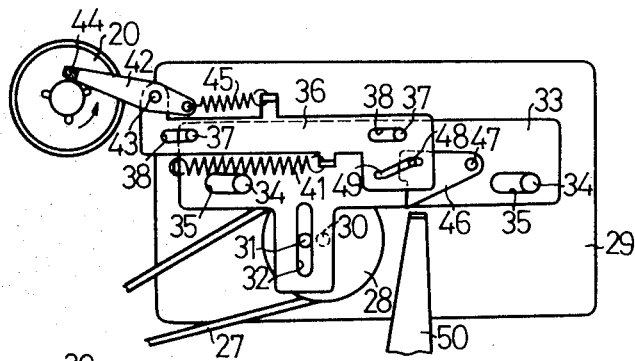
FIGS. 2A, 2B and 2C are top views of essential parts of said example in different modes of operation.

This invention is fully described hereinafter with reference to the drawings.

The drawings are top views of an example of a magnetic recording and reproducing apparatus of this invention, and they illustrate the mechanism which makes the apparatus in a mode of suspension automatically by detecting the stopping of the tape.

In the drawings, 1 indicates a stopping button lever, 2 indicates a fast forward winding button lever, 3 indicates a reproducing button lever, 4 indicates a rewinding button lever, 5 indicates a recording button lever, 6 indicates a pause lever, 7 indicates a locking lever which locks said levers 2, 3, 4 and 5 in depressed positions, 8, 9, 10, 11, 12 and 13 indicate tension springs of said levers, 1, 2, 3, 4, 5 and 6, 14 indicates a slide base which makes magnetic heads 17, 17 contact with tape 16 in a cassette 15 and makes a pinch roller 18 contact with a capstan 19 when said reproducing button lever 3 is depressed, 20 indicates a take-up reel disk, which is also called No. 1 rotator, 21 indicates a supply reel disk, 22 indicates a take-up pulley which transmits driving force from a cam portion 23 of said slide base 14 to said take-up reel disk 20 in some cases, and said take-up pulley 22 is driven by an electric motor 25 and a belt 26 with a fly wheel 24 which is rotatably mounted on the same shaft with the capstan 19.

This construction is almost the same as that of the conventional magnetic recording and reproducing apparatus, and the take-up reel disk 20 rotates in accordance with the run of the tape in the mode of reproducing, recording, fast forward winding, and rewinding operation, and stops when the run of the tape ends and the tape stops as the tape end is secured to the reel hub. However, said flywheel 24 and capstan 19 are always rotating regardless of the run of the tape.

Numeral 28 indicates a crank pulley which is driven by the capstan 19 and belt 27, which is also called No. 2 rotator, 29 is a sub-chassis on which said crank pulley 28 is rotatably mounted by the shaft 30. Numeral 31 indicates a crank pin which projects upwards on said crank pulley 28. Numeral 33 indicates a main lever which has a crank slot 32 which is engaged with said crank pin 31. Numerals 34, 34 indicate shafts which project upwards on the sub-chassis 29. Numerals 35, 35 indicate long slots which are set up on said main lever 33, and the main lever 33 is set up to move leftwards and rightwards by a definite stroke, guided by said shafts 34, 34 and long slots 35, 35. Numeral 36 indicates a sub-lever which is set up to be able to move leftwards and rightwards with the main lever 33 by the engagement of the shafts 37, 37 on the main lever 33 and the guide slots 38, 38 on the sub-lever 36 and the sub-lever 36 is urged leftwards by No. 1 spring 41 which is set up between a projection 39 on the main lever 33 and a projection 40 on the sub-lever 36 so that the right corners of the guide slots 38, 38 may contact with the shafts 37, 37. Numeral 42 indicates a detective lever which is rotatably mounted on said sub-lever 36 by the shaft 43. Numeral 44 indicates a frictional contact which is set up on the tip of said detective lever 42. Numeral 45 indicates No. 2 spring which is set up between the sub-lever 36 and the detective lever 42 so that said frictional contact 44 may be positioned on a straight line between the rotating center of the take-up reel disk 20 and said shaft 43.

The stroke of the movement of the main lever 33 is designed so that the main lever 33 may move leftwards further even if the frictional contact 44 of the detective lever 42 contacts with the take-up reel disk 20.

In the next place, how to detect the change of the positional relation between the main lever 33 and the sub-lever 36 is described.

Numeral 46 indicates a control lever which is pivotally mounted on the main lever 33 by the shaft 47. Numeral 48 indicates a guide pin which projects upwards on said control lever. Numeral 49 is a sloped guide slot which is set up on the sub-lever 36 to guide said guide pin 48.

In this place, the guide pin 48 is halting relative to the sub-lever 36 at one end of the sloped guide slot 49 while the sub-lever 36 is moving leftwards and rightwards with the main lever 33, and the guide pin 48 moves along the sloped guide slot 49 to the other end of the latter when the sub-lever 36 stops, not following the main lever 33.

Furthermore, a relay lever 50, one end of which is moved leftwards by the rotative displacement of said control lever 46 is rotatably mounted by the shaft 51 on the main chassis, and the other end of said relay lever 50 is connected with said locking lever 7 by a long slot 52 and a pin 53.

The automatic tape stopping detective device of this invention is constructed like the above description. The behavior of the device is described with the drawings FIGS. 2A, 2B and 2C.

FIG. 2A illustrates the state where the take-up reel disk 20 is rotating in a counterclockwise direction in the mode of reproducing, recording, or fast forward winding operation, and the sub-lever 36 on the main lever 33 moves leftwards and rightwards by the crank pin 31 of the crank pulley 28 and the crank slot 32 of the main lever 33 with the shafts 37, 37 contacting with the right corners of the guide slots 38, 38.

In the leftward movement of the main lever 33, the frictional contact 44 of the detective lever 42 moves along the rotating direction of the take-up reel disk 20 receiving the rotating force of that from the time when the frictional contact 44 contacts with the rotating surface of the take-up reel disk 20, and therefore the leftward movement of the sub-lever 36 from the position illustrated by FIG. 1 to the position illustrated by FIG. 2A is permitted by the fact that the detective lever 42 moves leftwards with shaking its head and repelling to the force of the No. 2 spring 45. The detective lever 42 comes back to the position illustrated by FIG. 1 by the force of the No. 2 spring 45 when the main lever 33 moves rightwards apart from the take-up reel disk 20.

Figure 2B:
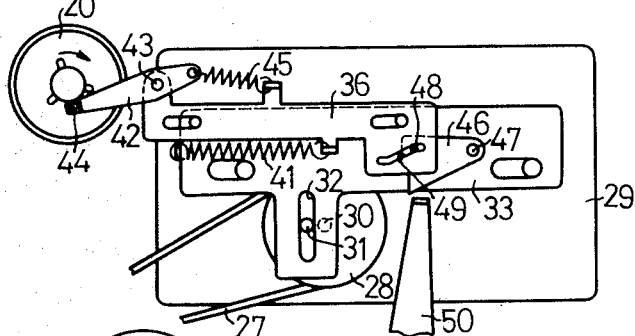

FIG. 2B illustrates the state where the take-up reel disk 20 is rotating in a clockwise direction in the mode of rewinding operation. In this case, the frictional contact 44 moves along the reverse side of the rotating surface of the take-up reel disk 20 compared to the above, and the leftward movement of the sub-lever 36 with the main lever 33 is permitted similarly to the above-mentioned mechanism by the movement of the detective lever 42 with shaking its head.

That is to say, the main lever 33 and the sub-lever 36 move leftwards and rightwards together as illustrated by FIG. 2A or FIG. 2B when the tape is running. And the control lever 46 is made to be in the controlled position in FIG. 2A and FIG. 2B by the engagement of the sloped guide slot 49 and the guide pin 48. However, when the run of the tape and the rotation of the take-up reel disk 20 stops, the front face of the frictional contact 44 of the detective lever 42 continues to contact with the surface of the take-up reel disk 20. That is to say, the detective lever 42 halts in the position illustrated by FIG. 2C without shaking its head because the rotating force is not transmitted to the frictional contact 44. Therefore, a relative positional displacement between the main lever 33 and the sub-lever 36 results from the fact that the main lever 33 moves leftwards regardless of the halting of the sub-lever 36.

Figure 2C:
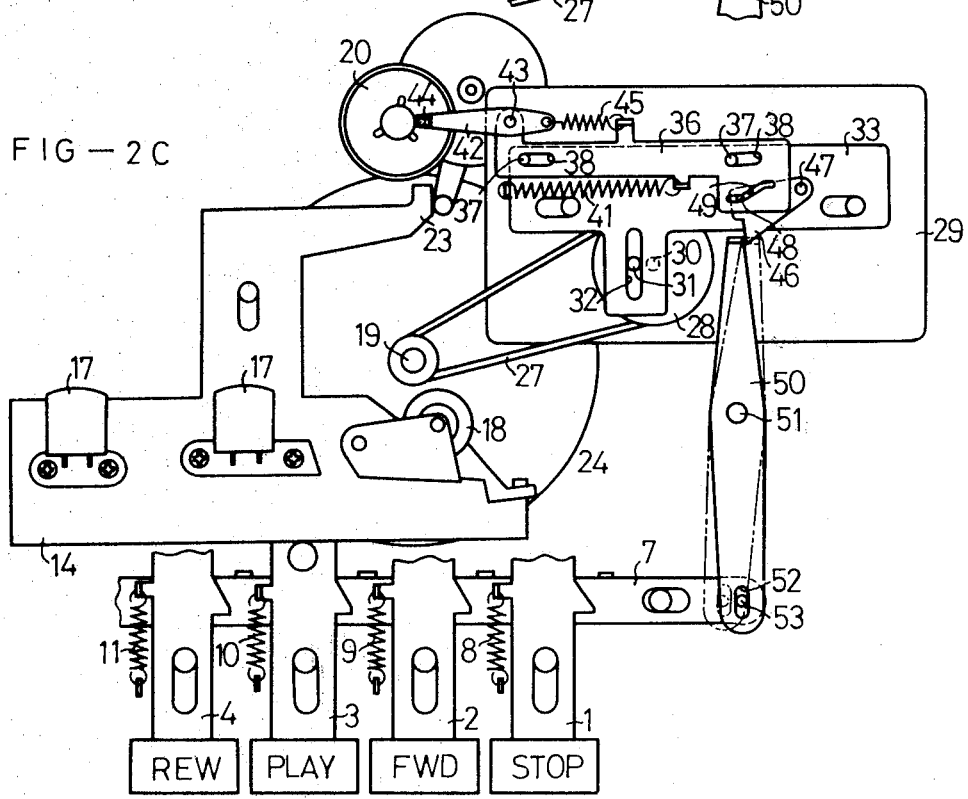

Accordingly, the control lever 46, the guide pin 48 of which moves along the sloped guide slot 49 from one end of the latter to the other end of the latter on account of the leftward movement of the main lever 33 regardless of the halting of the sub-lever 36, pivotally rotates as illustrated by FIG. 2C. That is, the control lever 46 is made to move to the controlled position in FIG. 2C by the engagement of the sloped guide slot 49 and the guide pin 48.

Then, the control lever 46 projects to the position where the one end of the relay lever 50 is disposed and makes the relay lever 50 rotate from the position in broken lines to the position in the full lines.

Therefore, the locking lever 7 is moved by an important stroke to unlock the operational push buttons, and the magnetic recording and reproducing apparatus is made in a mode of suspension automatically.

The above description is concerned with the so-called full auto stopping device which makes the magnetic recording and reproducing apparatus in a mode of suspension in all cases after the stopping of the tape. However, this invention is also applicable to a device which changes the direction of the run of the tape in reverse automatically by the detection of the stopping of the tape.

On the other hand, although the locking lever 7 is directly operated by the relay lever 50 in the above, it is also possible to operate the locking lever 7 by utilizing the inertial energy of the fly wheel 24. Furthermore, it is possible to replace the shaft 34 and the guide shaft 37 by one shaft by putting the guide slot 38 of the sub-lever 36 upon the long slot 35 of the main lever 33.

As described in the above, the device of this invention detects the stopping of the run of the tape by the displacement of the main lever, the sub-lever, and the control lever, which are not displaced while the main lever and the sub-lever are moving leftwards and rightwards together and displaced otherwise. As it is possible to dispose these levers on approximately the same space, it is possible to provide a small tape recorder with an automatic tape stopping detective device of this invention.

Therefore, it is possible to detect surely the stopping of the run of the tape in each mode of operation.

In the next place, the other example of this invention is described referring to the drawings, FIGS. 3A, 3B and 3C.

Ellipse slots 55, 55 are set up on a position decisive lever 54, and these ellipse slots 55, 55 are engaged with the guide shafts 56, 56 which project upwards on the sub-chassis 29, and No. 3 spring 57 is established between said position decisive lever 54 and the sub-chassis 29. The position decisive lever 54 is urged leftwards, capable of moving within the scope of the ellipse slots 55, 55. Furthermore, the front line 58 of the position decisive lever 54 is made to coincide with the back line 59 of the detective lever 42, and the detective lever 42 is set up to look toward the center of the No. 1 rotator 20.

Next, the behavior of this device is described. FIG. 3A illustrates the state where the detective lever 42 is positioned rightwards and the frictional contact 44 does not contact the take-up reel disk 20, and the back line 59 of the detective lever 42 faces closely to the front line 58 of the position decisive lever 54, and the detective lever 42 is pressing the position decisive lever 54 rightwards, repelling to the No. 3 spring 57. Then, the detective lever 42 looks toward the center of the take-up reel disk 20.

When the detective lever 42 moves leftwards with the main lever 33 and the sub-lever 36 by the rotation of the crank pulley 28, the frictional contact 44 contacts with the take-up reel disk 20 as illustrated by FIG. 3B and the detective lever 42 is shaken along the rotating direction of the take-up reel disk 20. In this place, when the position decisive lever 54 moves to the position illustrated by FIG. 3B, the right corner of the ellipse slot 55 contacts with the shaft 56, and the position decisive lever 54 does not move leftwards further from said position, and only the detective lever 42 is able to move leftwards farther.

Accordingly, the detective lever 42 becomes free from the position decisive lever 54 as illustrated by FIG. 3C because of the leftward movement of the sub-lever 36. Therefore, any force to obstruct the rotation of the take-up reel disk 20 is not transmitted to the take-up reel disk 20, and any wow flutter does not arise at all.

Henceforth, the detective lever 42 moves rightwards with the sub-lever 36 to the position illustrated by FIG. 3B, and the detective lever 42 contacts with the position decisive lever 54, and the back line 59 of the detective lever 42 coincides with the front line of 58 of the position decisive lever 54, and the detective lever 42 looks toward the center of the take-up reel disk 20.

Besides, the length of said ellipse slot 55 is designed for the front line 58 of the position decisive lever 55 to continue to contact with the back line 59 of the detective lever 54 until the time when the detective lever 42 contacts with the take-up reel disk 20.

Therefore, in the case of the example illustrated by the drawings FIGS. 3A, 3B and 3C, the detective lever 42 is not urged to the take-up reel disk 20 while the position decisive lever 54 moves from the position illustrated by FIG. 3B to that of FIG. 3C because the No. 1 spring 45 illustrated by FIG. 1 is not used, and any bad effect is not added to the rotation of the take-up reel disk 20, and the consumption of the detective lever 42 is prevented. Furthermore, it is impossible that the position to which the detective lever 42 comes back becomes unstable by the friction between the detective lever 42 and the shaft 43.

In the present application, it should be understood that it is not only possible to use the take-up reel disk as No. 1 rotator, but also to use a rotator which is provided rotatable with the rotation of the take-up reel disk as the No. 1 rotator.

What is claimed is:

1. An automatic tape stopping detective device in a magnetic recording and reproducing apparatus which detects the stopping of the run of the tape, comprising a take-up reel disk means which rotates with the run of the tape, a crank pulley means which always rotates whether the tape is running or not, a main lever operatively associated with a sliding mechanism, said means lever being driven by said crank pulley means, and moves in the left and right direction in a definite stroke, a sub-lever which is adapted to move in the left and right direction with said main lever when said take-up reel disk means is rotating and stops regardless of the movement of said main lever when said take-up reel disk means is not rotating, and a control lever pivotally mounted on said main lever, said control lever moving with the movement of said main lever when said sub-lever stops.

2. The automatic tape stopping detective device according to claim 1, wherein a detective lever is rotatably mounted on said sub-lever, said detective lever making said sub-lever move with the movement of said main lever by moving along the rotating direction of said take-up reel disk means while said take-up reel disk means is rotating, and said detective lever making said sub-lever stop regardless of the movement of said main lever by stopping when faced to said take-up reel disk means when said take-up reel disk means stops rotating.

3. An automatic tape stopping detective device according to claim 2, which has a sliding mechanism of the sub-chassis and said main lever, a sliding mechanism of said main lever and said sub-lever, a spring urging said sub-lever toward said main lever in one direction, and a spring urging said detective lever toward said sub-lever in one direction.

4. An automatic tape stopping detective device according to claim 2, which has a position decisive means which makes said detective lever look toward the rotating center of said No. 1 rotator until the time when the detective lever contacts with said No. 1 rotator and makes the detective lever apart from said position decisive means itself afterwards.

5. The automatic tape stopping detective device according to claim 1, wherein the sub-lever is provided with a sloped guide slot and the control lever is provided with a guide pin, said guide pin being slidably disposed in said guide slot so that said control lever is placed in a non-controlled position when said sub-lever moves with the movement of said main lever and is made to move to a controlled position when said sub-lever stops, regardless of the movement of said main lever.

6. The automatic tape stopping detective device according to claim 1, wherein the control lever is provided with a sloped guide slot and the sub-lever is provided with a guide pin, said guide pin being slidably disposed in said guide slot so that said control lever is placed in a non-controlled position when said sub-lever moves with the movement of said main lever and is made to move to a controlled position when said sub-lever stops, regardless of the movement of said main lever.

7. The automatic tape stopping detective device according to claim 2, which is further provided with a spring between said sub-lever and said detective lever which directs said detective lever toward the rotating center of said take-up reel disk means until said detective lever contacts said take-up reel disk means.

8. The automatic tape stopping detective device according to claim 2, further provided with a position decisive means which is adapted to move with the movement of said detective lever toward the rotating center of said take-up reel disk means, said detective lever stopping when it contacts said take-up reel disk means, regardless of the movement of said take-up reel disk means after the time when said detective lever contacts said take-up reel disk means.

* * * * *

UNITED STATES PATENT AND TRADEMARK OFFICE
CERTIFICATE OF CORRECTION

PATENT NO. : 4,018,404
DATED : April 19, 1977
INVENTOR(S) : Yasuo SAMI

It is certified that error appears in the above-identified patent and that said Letters Patent are hereby corrected as shown below:

Column 5:

Lines 46-47, change "said means lever" to --said main lever--.

Signed and Sealed this

Second Day of May 1978

[SEAL]

Attest:

RUTH C. MASON
Attesting Officer

LUTRELLE F. PARKER
Acting Commissioner of Patents and Trademarks